United States Patent Office 3,595,960
Patented July 27, 1971

3,595,960
TREATMENT OF HYPERTENSION WITH α-(SUB-STITUTED - 4 - AMINOPHENYL) - α - LOWER ALKYLGLUTARIMIDE
Robert Gaunt, Chatham, N.J., assignor to Ciba Corporation, Summit, N.J.
No Drawing. Filed Dec. 3, 1968, Ser. No. 780,889
Int. Cl. A61k 27/00
U.S. Cl. 424—267
5 Claims

ABSTRACT OF THE DISCLOSURE

α-(4-aminophenyl)-α-lower alkylglutarimides, e.g. those of the formula

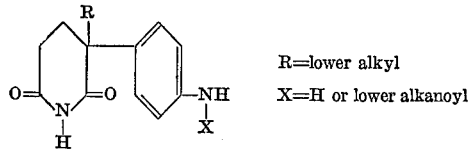

R=lower alkyl
X=H or lower alkanoyl and salts thereof decrease blood pressure in hypertensives with reduced renin blood levels and normal or reduced mineralocorticoid secretion rate.

BACKGROUND OF THE INVENTION

Of the α-(4-aminophenyl)-α-lower alkylglutarimides disclosed in Pat. No. 2,848,455, the α-ethyl derivative, i.e. aminoglutethimide, has been used in the form of 125 and 250 mg. tablets as anticonvulsant which, alone or particularly as an adjunct, controls seizures in most forms of epilepsy, even in cases refractory to other therapeutic agents. Furthermore, it has been shown that aminoglutethimide inhibits at high dosage levels the secretion of adrenal cortical hormones in both animals and man.

According to Skelton, Proc. Soc. Exp. Biol. & Med. 90; 342, 1955, hypertension can be produced in rats by removing one kidney together with its adrenal gland and enucleating the second adrenal, i.e. slitting the capsule of the gland and with gentle pressure squeezing out most of its contents, and providing 1% NaCl as a drinking fluid. This leaves the capsule with only an adhering rim of glandular cells. This remnant, however, regenerates into a new adrenal cortex without the medulla. The hypertension that results is called Adrenal Regeneration Hypertension (A.R.H.). All available evidence shows that a regenerated adrenal is, if anything, hypofunctional. Hence there is no reason to believe that A.R.H. is caused by excessive secretion of some of the known hormones from the regenerated adrenal. It is well known that excesses of the known adrenal cortical hormones, particularly the mineralocorticoids, such as aldosterone, can cause hypertension in both man and animals. A.R.H., however, is probably analogous to an enigmatic type of human hypertension characterized by reduced blood levels of the enzyme renin without the expected concomitant increases in the secretion of aldosterone or other known mineralocorticoids.

Surprisingly it was found that the adrenal inhibiting α-(4-aminophenyl)-α-lower alkylglutarimides, especially aminoglutethimide, when given daily by stomach tube, e.g. in the form of an aqueous suspension, at dosages between about 10 and 100 mg./kg., preferably at about 50 mg./kg., to rats with but one enucleated (i.e. hypofunctional) adrenal, largely prevents the development of A.R.H.

SUMMARY OF THE INVENTION

The present invention concerns and has for its object the provision of a new antihypertensive pharmaceutical composition comprising (a) about 300 to about 900 mg., preferably about 400 to about 800 mg. per dosage unit of a compound having the Formula I

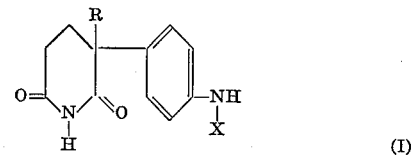
(I)

in which R is lower alkyl and X is hydrogen or lower alkanoyl, or a therapeutically acceptable acid addition salt thereof, and (b) a pharmaceutical excipient, as well as of a new method of treating hypertensives exhibiting reduced renin blood levels and normal or reduced mineralocorticoid secretion rate, with said active compounds of Formula I, advantageously in the form of orally applicable pharmaceutical compositions.

DESCRIPTION OF THE PREFERRED EMBODIMENTS

The active ingredients of the compositions claimed herein are described in Pat. No. 2,848,455. Preferred is the α-(4 - aminophenyl)-α-ethyl-glutarimide (aminoglutethimide). They may be used in the free form or in the form of therapeutically acceptable acid addition salts thereof, for example, such of inorganic acids, e.g. hydrochloric, hydrobromic, sulfuric, phosphoric, nitric or perchloric acid, or organic acids, such as carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-amino-benzoic, anthranilic, 4-hydroxybenzoic, salicylic, aminosalicylic, embonic, nicotinic, methanesulfonic, ethanesulfonic, hydroxyethanesulfonic, ethylenesulfonic, benzenesulfonic, halogenbenzenesulfonic, toluenesulfonic, naphthalenesulfonic and sulfanilic acid; methionine, tryptophan, lysine or arginine.

The compositions according to the invention contain said active ingredients in an amount between about 300 and 900 mg., preferably between about 400 and 800 mg. per unit dosage, in conjunction or admixture with inorganic or organic, solid or liquid pharmaceutical excipients, suitable for enteral or parenteral administration. Suitable excipients are substances that do not react with the active ingredient, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohol, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances, such as cortical hormones, e.g. prednisone. Said pharmaceutical compositions are prepared by conventional methods and contain about 1 to 75%, more particularly 10 to 60%, of the active ingredient.

The method of treatment according to the invention consists in administering to a host suffering from hypertension with suppressed renin blood levels and normal or reduced mineralocorticoid secretion rate, about 8–15 mg./kg./day, preferably about 10 mg./kg./day, of said active α-(4-aminophenyl)-α-lower alkylglutarimides, their lower alkanoyl derivatives or salts, preferably in the form of the above compositions, advantageously in an orally applicable form, e.g. as tablet, dragee or capsule, in a single or in multiple dosage unit forms.

The following examples are intended to illustrate the invention and are not to be construed as being limitations thereon.

EXAMPLE 1

Preparation of 1,000 tablets each containing 300 mg. of the active ingredient:

Formula

| | G. |
|---|---|
| Aminoglutethimide | 300.0 |
| Lactose | 294.0 |
| Tragacanth | 7.0 |
| Sucrose | 7.0 |
| Talcum | 17.5 |
| Stearic acid | 3.5 |
| Wheat starch | 7.5 |
| Polyethylene glycol | 14.0 |
| 50% aqueous ethanol, q.s. | |

Procedure

All the powders are passed through a screen with openings of 1.2 mm. Then the drug substance, lactose, tragacanth, sucrose and talcum are mixed in a suitable mixer and granulated with the solution of polyethylene glycol in about 6.5 liter of the ethanol, if necessary, with an additional amount of ethanol. The granulate is dried overnight to a moisture content of about 1–2%, broken on a screen with 0.85 mm. openings and mixed with the stearic acid and starch, and compressed into tablets using standard concave punches with 10.3 mm. diameter, uppers bisected.

EXAMPLE 2

Preparation of 1,000 tablets each containing 400 mg. of the active ingredient:

Formula

| | G. |
|---|---|
| Aminoglutethimide | 400.0 |
| Hydrolyzed starch | 300.0 |
| Polyvinylpyrrolidone | 20.0 |
| Corn starch | 30.0 |
| Stearic acid | 5.0 |
| Magnesium stearate | 5.0 |
| Microcryst cellulose | 40.0 |

Procedure

All the powders are passed through a screen with openings of 0.85 mm. and mixed in a suitable mixer. The blend is compressed into tablets using standard concave punches with 10.3 mm. diameter, uppers bisected.

EXAMPLE 3

Preparation of 1,000 tablets each containing 450 mg. of the active ingredient:

Formula

| | G. |
|---|---|
| Aminoglutethimide | 450.0 |
| Lactose | 290.0 |
| Aqueous sucrose 67% | 45.0 |
| Talcum | 20.0 |
| Stearic acid | 5.0 |
| Magnesium stearate | 5.0 |

Procedure

All the powders are passed through a screen with openings of 1.2 mm. Then the drug substance, lactose and talcum are mixed in a suitable mixer and granulated with the sucrose solution, if necessary, with an additional amount of water. The granulate is dried to a moisture content of about 1–3%, broken on a screen with 0.85 mm. openings, mixed with the stearic acid and magnesium stearate and compressed into tablets using standard concave punches with 12 mm. diameter, uppers quartered.

What is claimed is:

1. A method of treating hypertensives with reduced renin blood levels and normal or reduced mineralocorticoid secretion rate, which consists in the administering to a host suffering from said hypertension about 8 to 15 mg./kg./day of an α-(4-amino-phenyl)-α-lower alkylglutarimide of the formula

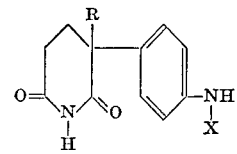

in which R is lower alkyl and X is hydrogen or lower alkanoyl, or a therapeutically acceptable acid addition salt thereof.

2. A method as claimed in claim 1, wherein about 10 mg./kg./day of the α-(4-aminophenyl)-α-lower alkylglutarimide or its salt is administered.

3. A method as claimed in claim 1, wherein about 10 mg./kg./day of α-(4-aminophenyl)-α-ethylglutarimide is administered.

4. A method as claimed in claim 1, wherein a composition comprising (a) about 300 to about 900 mg. per dosage unit of the α-(4-aminophenyl)-α-lower alkyl-glutarimide or the therapeutically acceptable acid addition salt thereof, and (b) a pharmaceutical excipient, is administered.

5. A method as claimed in claim 1, wherein a composition comprising (a) about 300 mg. to about 450 mg. per dosage unit of α-(4-amino-phenyl)-α-ethylglutarimide and (b) about 350 mg. to about 400 mg. of an orally applicable pharmaceutical excipient, is administered.

References Cited

UNITED STATES PATENTS 2,848,455  8/1955  Hoffman et al. _____ 260—281

FOREIGN PATENTS

Grollman, Pharmacology & Therapeutics, pp. 528–529, 6th ed. (1965).

STANLEY J. FRIEDMAN, Primary Examiner